United States Patent
Ruan et al.

(10) Patent No.: US 9,405,758 B2
(45) Date of Patent: Aug. 2, 2016

(54) METHOD AND SYSTEM FOR IDENTIFYING FILE TYPE

(71) Applicant: Huawei Technologies Co., Ltd., Shenzhen (CN)

(72) Inventors: Linghong Ruan, Beijing (CN); Wu Jiang, Beijing (CN); Shiguang Li, Beijing (CN); Zhenhui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 14/314,711

(22) Filed: Jun. 25, 2014

(65) Prior Publication Data
US 2014/0310322 A1 Oct. 16, 2014

Related U.S. Application Data

(63) Continuation of application No. PCT/CN2012/080831, filed on Aug. 31, 2012.

(30) Foreign Application Priority Data

Dec. 31, 2011 (CN) .......................... 2011 1 0459487

(51) Int. Cl.
G06F 17/30 (2006.01)
(52) U.S. Cl.
CPC ...... *G06F 17/30115* (2013.01); *G06F 17/3012* (2013.01)
(58) Field of Classification Search
CPC ............ G06F 21/10; G06F 2221/2101; G06F 2221/2135; G06F 2221/0737; G06F 21/86
See application file for complete search history.

(56) References Cited

U.S. PATENT DOCUMENTS

2002/0120886 A1\* 8/2002 Nguyen ................ G06F 11/328
714/39
2010/0070901 A1 3/2010 Skinner et al.
(Continued)

FOREIGN PATENT DOCUMENTS

| CN | 101770470 A | 7/2010 |
| JP | 2011138189 A | 7/2011 |
| WO | 2010033621 A2 | 3/2010 |

OTHER PUBLICATIONS

Pontello, M., "Marco Pontello's Home—Software—TrID," Retrieved from the Internet: URL: https://web.archive.org/web/20111205042700/http://mark0.net/soft-tride-e.html, XP055132981, Dec. 5, 2011, 3 pages.
(Continued)

*Primary Examiner* — Truong Vo
(74) *Attorney, Agent, or Firm* — Conley Rose, P.C.; Grant Rodolph

(57) ABSTRACT

A method and a system for identifying a file type. A modification interface may be provided so that a user inputs a file feature parameter, and the file feature parameter input by the user is added to a file type configuration file, then the file type configuration file is loaded to a state machine to perform file type identification. Therefore, the user can modify a file feature parameter in the original file type configuration file, and when a file feature parameter of a file of a certain type is changed or a file of a new type appears, the user can update a file feature parameter in the state machine in time to identify the changed file or the file of the new type. In this way, the user does not need to search for an identification tool on the Internet.

11 Claims, 3 Drawing Sheets

(56) References Cited

U.S. PATENT DOCUMENTS

2011/0270858 A1 11/2011 Zhuang et al.
2014/0250425 A1* 9/2014 Kumar ................... G06F 9/44
                                                                717/121

OTHER PUBLICATIONS

Pontello, M., "Marco Pontello's Home—TrIDScan—Patterns Scanner," Retrieved from the Internet: URL: https://web.archive.org/web/20111213005235/http://mark0.net/soft-tridscan-e.html, XP055132987, Dec. 13, 2011, 3 pages.

Pontello, M., "Marco Pontello's Home—TrIDNet—File Identifier," Retrieved from the Internet: URL: https://web.archive.org/web/20111226163949/http://mark0.net/soft-trident-e.html, XP055133431, Dec. 25, 2011, pages.

"File Signatures Table," Retrieved from https://web.archive.org/web/20111229172123/http://www.garykessl..., XP055133137, Nov. 29, 2011, 38 pages.

Hickok, D., et al., "File Type Detection Technology," Midwest Instruction and Computing Symposium, XP055133145, Apr. 9, 2005, 12 pages.

Foreign Communication From a Counterpart Application, European Application No. 12863533.1, Extended European Search Report dated Aug. 22, 2014, 12 pages.

Foreign Communication From a Counterpart Application, Chinese Application No. 201110459487.6, Chinese Office Action dated Dec. 4, 2015, 4 pages.

Foreign Communication From a Counterpart Application, Chinese Application No. 201110459487.6, Chinese Search Report dated Dec. 4, 2015, 2 pages.

Zhang, R., "Recognizing and Matching of File Type based on Identifiers," Computer Security, Jun. 2011, 3 pages.

English Translation of Zhang, R., "Recognizing and Matching of File Type based on Identifiers," Computer Security, Jun. 2011, 4 pages.

Foreign Communication From a Counterpart Application, PCT Application No. PCT/CN2012/080831, International Search Report dated Nov. 8, 2012, 2 pages.

Foreign Communication From a Counterpart Application, PCT Application No. PCT/CN2012/080831, Written Opinion dated Nov. 8, 2012, 7 pages.

* cited by examiner

METHOD AND SYSTEM FOR IDENTIFYING FILE TYPE

CROSS-REFERENCE TO RELATED APPLICATION

This application is a continuation of International Application No. PCT/CN2012/080831, filed on Aug. 31, 2012, which claims priority to Chinese Patent Application No. 201110459487.6, filed on Dec. 31, 2011, both of which are hereby incorporated by reference in their entireties.

TECHNICAL FIELD

The present invention relates to the field of file type identification technologies, and in particular, to a method and a system for identifying a file type.

BACKGROUND

With the development of networks, people increasingly use a network for information transmission, and this also brings a security issue about the information transmission by using the network.

During information transmission on a network, generally a network device integrates transmitted information into a certain file format. After receiving a file sent by using the network by another network device, a computer or a network device generally detects the file. If a type of the file is identifiable and is a secure file type, the network device at a receiving end can subsequently receive and use the file. When it is identified that the type of the file does not belong to a secure file type, processing such as alerting may be performed.

However, when the type of the file transmitted by using the network cannot be identified, a user needs to search the Internet for a tool capable of identifying the file type, and this is quite complicated and has a low success rate. In addition, according to an existing security mechanism, generally a file type that cannot be identified will be processed as an insecure file to protect security of the network device as much as possible. In this way, some secure information cannot be received because the file type cannot be identified.

SUMMARY

To solve the foregoing technical problem, embodiments of the present invention provide a method and a system for identifying a file type to more effectively identify a file type. The technical solutions are as follows:

A method for identifying a file type includes: providing a modification interface, where the modification interface is used to update a file feature parameter in a file type configuration file; receiving a file feature parameter, and adding the file feature parameter to a corresponding file type configuration file to obtain an updated file type configuration file, where the file feature parameter is input by a user by using the modification interface; and loading the updated file type configuration file to a state machine to cause a file feature parameter in the state machine to be updated, so that the state machine performs file type identification according to the updated file feature parameter.

Preferably, the loading the updated file type configuration file to a state machine includes controlling the state machine to perform initialization, compiling the file type configuration file after the initialization of the state machine is complete to generate a target program, and loading the target program to the state machine.

Preferably, when the file type identification of the state machine fails, an alerting module is controlled to perform alerting processing.

Preferably, the file feature parameter includes a file type and feature field information.

Preferably, the feature field information includes a feature field type, feature field content, a feature field length, and a feature field offset.

Preferably, the file type configuration file is an extensible markup language XML configuration file.

Preferably, the modification interface is a Web page or a command line interface.

The present invention further provides a system for identifying a file type, including: a modification interface providing module, a file feature parameter adding module, a configuration file loading module, and a state machine, where the modification interface providing module is configured to provide a modification interface, where the modification interface is used to update a file feature parameter in a file type configuration file; the file feature parameter adding module is configured to receive a file feature parameter, and add the file feature parameter to a corresponding file type configuration file to obtain an updated file type configuration file, where the file feature parameter is input by a user by using the modification interface; and the configuration file loading module is configured to load the updated file type configuration file to the state machine to cause a file feature parameter in the state machine to be updated, so that the state machine performs file type identification according to the updated file feature parameter.

Preferably, the configuration file loading module includes: a state machine initializing submodule, a compiling submodule, and a program loading submodule, where the state machine initializing submodule is configured to control the state machine to perform initialization; the compiling submodule is configured to compile the file type configuration file after the initialization of the state machine is complete to generate a target program; and the program loading submodule is configured to load the target program to the state machine.

Preferably, the system for identifying a file type further includes an alerting module configured to perform alerting processing when the file type identification of the state machine fails.

By applying the foregoing technical solutions, according to a method and a system for identifying a file type provided in the present invention, a modification interface may be provided so that a user inputs a file feature parameter, and the file feature parameter input by the user is added to a file type configuration file, then the file type configuration file is loaded to a state machine to perform file type identification. Therefore, the user can modify a file feature parameter in the original file type configuration file, and when a file feature parameter of a file of a certain type is changed or a file of a new type appears, the user can update a file feature parameter in the state machine in time to identify the changed file or the file of the new type. In this way, the user does not need to search for an identification tool on the Internet.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present

DESCRIPTION OF EMBODIMENTS

To make a person skilled in the art better understand the technical solutions in the present invention, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
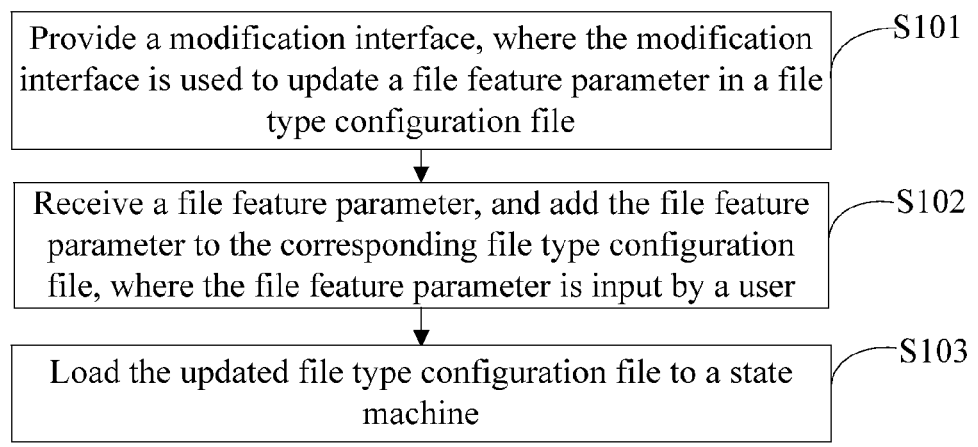
FIG. 1 is a schematic flowchart of a method for identifying a file type according to an embodiment of the present invention.

As shown in FIG. 1, a method for identifying a file type according to an embodiment of the present invention includes:

S101. Provide a modification interface, where the modification interface is used to update a file feature parameter in a file type configuration file.

The file feature parameter may include feature field information, and may also include a name extension.

It is easily understood that most file types can be identified according to a name extension of a file. For example, a name extension of a Word file is ".doc". It is quite simple to identify a file type by using a name extension, but a problem of low accuracy exists at the same time. It may be understood that name extensions of many files can be modified. When a name extension of a certain file is intentionally changed to a type inconsistent with an actual type of the file, if file type identification is performed by using only the name extension, the type of the file will be identified as the type inconsistent with the actual type of the file, thereby bringing many problems in subsequent use of the file. For example, a name extension ".doc" of a Word file is changed to an image file format ".jpg", and then an electronic device identifies the file as an image file and opens the file by using image software by default, thereby causing a failure to open the file. Therefore, performing the file type identification by simultaneously using the name extension and the feature field information can improve accuracy of the identification. When a file name extension fails to be identified or some files do not have a name extension, the file type identification may also be performed by using only the feature field information. Considering low accuracy of the name extension identification, the file type identification may also be performed without using the name extension, or the name extension identification serves as a check of the file type identification using the feature field information. When a file type identified by using the feature field information is inconsistent with a file type identified by using the name extension, information for notifying inconsistency between the file type and the name extension may be generated to prompt a user for performing processing.

The feature field information may include a feature field type, feature field content, a feature field length, and a feature field offset.

It should be noted that the feature field type is a coding mode that uniquely identifies a file type feature, and generally may be classified into a character string and a hexadecimal system. The feature field content is a magic number that uniquely identifies a file type. According to the feature field type, the feature field content may be a character string or a hexadecimal string. The feature field length is a length of the feature field content. The feature field offset is a position at which a feature field appears in file content.

There may be multiple pieces of feature field information. In a process of the file type identification, if any number of pieces of the feature field information can be matched, the type of the file can be identified.

In an actual application, a file feature parameter may correspond to a file type, and when a file feature parameter that corresponds to a first file type matches a feature parameter of a first file to be identified, the first file can be identified as the first file type. A file type may also be input as a part of a file feature parameter into the file type configuration file.

The modification interface may be a Web page.

In an actual application, generally a user is accustomed to configuring a system by using the Web page, formatting a current file type configuration file in a certain manner, and making presentation in a Web manner. This makes the configuration become more vivid and easily understood, and achieves a very convenient and simple operation.

The modification interface may also be a command line interface.

When modification is performed by using a command input interface, a file type to be modified can be pertinently and directly selected, or certain feature field information of a certain file type may be modified, achieving a direct, fast, and strongly pertinent operation.

S102. Receive a file feature parameter, and add the file feature parameter to the corresponding file type configuration file to obtain an updated file type configuration file, where the file feature parameter is input by the user by using the modification interface.

The file type configuration file stores configuration information necessary for a system. By using the configuration file to store the file feature parameter and modifying the configuration file, accuracy of a file type identification function can be adjusted.

A type of the configuration file may be a configuration (config) file, an INI file, an XML file, or the like. An extensible markup language (XML) file has a clear structure, strong expression capability, and proper scalability, and facilitates information transmission between different systems. Therefore, an XML file is used as the configuration file of the system.

It is easily understood that the type of the configuration file may be of a scripting language, such as XML or hypertext markup language (HTML). Such a configuration file is universal on various platforms, and has desirable portability. In terms of implementation, almost all programs are capable of processing a configuration file such as XML. When a new file type feature needs to be added, information is provided according to content of the configuration file, and the configuration file can be read again to add a new requirement of the user without changing code, thereby achieving desirable maintainability.

For ease of understanding, the following discloses content in an XML configuration file:

```
<File>
    <Type>CAD file</Type>                          The type is a CAD file.
    <Extension>.dwg</Extension>                    The name extension is .dwg.
    <Description>CAD file</Description>            Description information is "CAD file".
    <CharacterList>                                A file feature list has the following content:
        <CharacterType> bin </CharacterType>         The feature field type is the hexadecimal
system.
        <Character>0x4D534346</Character>            The feature field content is 0x4D534346.
        <Length>4</Length>                           The feature field length is four bytes.
        <Offset>0</Offset>                           The feature field offset is 0.
    </CharacterList>                               The file list ends.
    <Action>block</Action>                         A response type is blocking.
</File>
where:
    the Type field represents the file type, such as pdf, doc, ppt, or CAD;
    the Extension field represents the file name extension (which is an optional field),
such as .doc or .pdf;
        the Description field represents description information;
        the CharacterList field represents a file feature list;
        the CharacterType field represents the feature field type, which is the character string
(string) or the hexadecimal system (bin);
        the Character field represents the feature field content, which is content of the string
type or content of a hexadecimal string, for example, feature field content of a PDF
file is 0x25504446 in hexadecimal system;
        the Length field represents the feature field length;
        the Offset field represents the feature field offset; and
        the Action field represents a response type, which is alert (alert) or block (block).
```

S103. Load the updated file type configuration file to a state machine to cause a file feature parameter in the state machine to be updated, so that the state machine performs file type identification according to the updated file feature parameter.

Figure 2:
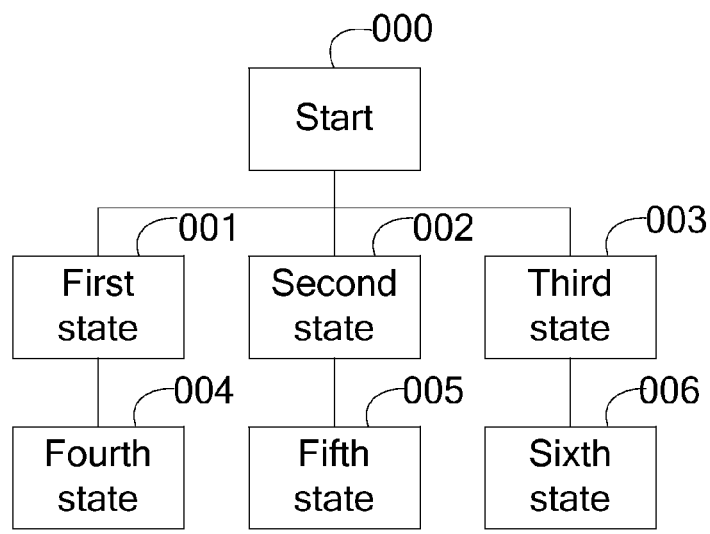
FIG. 2 is a state tree disclosed in the present invention.

The state machine is a compiled data structure used to match a predefined mode set, and can be applied to file identification. After the file feature parameter is loaded to the state machine, the file type can be identified by using the state machine and processing can be performed according to different states. Specifically, multiple states may be set in a state machine of a tree structure, and when a certain state matches an object to be matched, state transition can be performed according to node distribution of a state tree. As shown in FIG. 2, the state tree includes a start state 000; three ultimate states: a fourth state 004, a fifth state 005, and a sixth state 006, where the ultimate states are used to indicate a manner of processing a file of a specific type; and three intermediate states: a first state 001, a second state 002, and a third state 003, where the intermediate states are used to indicate a file type. For example, a file feature parameter in the first state 001 is a file feature parameter of a file of a first type, a file feature parameter in the second state 002 is a file feature parameter of a file of a second type, and a file feature parameter in the third state 003 is a file feature parameter of a file of a third type. When a file to be identified by an electronic device is a file of the first type, the file feature parameter in the first state 001 matches the file feature parameter of the file of the first type. Then, the file to be identified is identified as the file of the first type, and the state 001 transits to the fourth state 004, which is an ultimate state. The fourth state 004 is set according to a file type that can be identified by the first state 001. For example, the fourth state 004 is sending of an alert signal, blocking of sending of a received signal, or the like.

Figure 3:
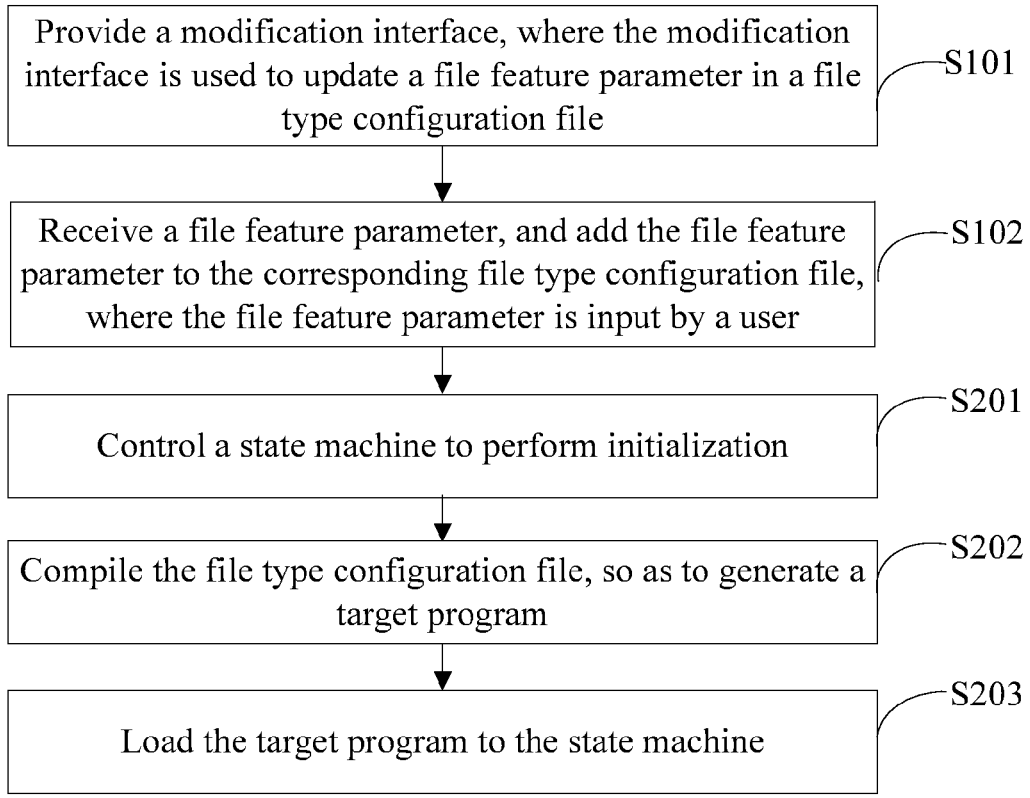
FIG. 3 is a schematic flowchart of another method for identifying a file type according to an embodiment of the present invention.

As shown in FIG. 3, in another method for identifying a file type according to an embodiment of the present invention, step S103 may include:

S201. Control the state machine to perform initialization.

Specifically, the initialization may include the following content pre-allocating a memory of the state machine, and setting a compilation parameter of the state machine.

S202. Compile the file type configuration file after the initialization of the state machine is complete to generate a target program.

After the compilation is performed, a predefined mode set may be compiled into a data structure used for implementing the matching.

S203. Load the target program to the state machine.

In this way, content in the updated file type configuration file can be loaded to the state machine and then used for the file type identification.

When the file type identification of the state machine fails, an alerting module is controlled to perform alerting processing.

In the method for identifying a file type shown in FIG. 3, step S101 and step S102 are the same as step S101 and step S102 in the method for identifying a file type shown in FIG. 1, and no longer repeated.

In the method for identifying a file type provided in the present invention, a modification interface may be provided so that a user inputs a file feature parameter, and the file feature parameter input by the user is added to a file type configuration file, then the file type configuration file is loaded to a state machine to perform file type identification. Therefore, the user can modify a file feature parameter in the original file type configuration file, and when a file feature parameter of a file of a certain type is changed or a file of a new type appears, the user can update a file feature parameter in the state machine in time to identify the changed file or the file of the new type. In this way, the user does not need to search for an identification tool on the Internet.

Corresponding to the foregoing method embodiments, the present invention further provides a system for identifying a file type.

Figure 4:
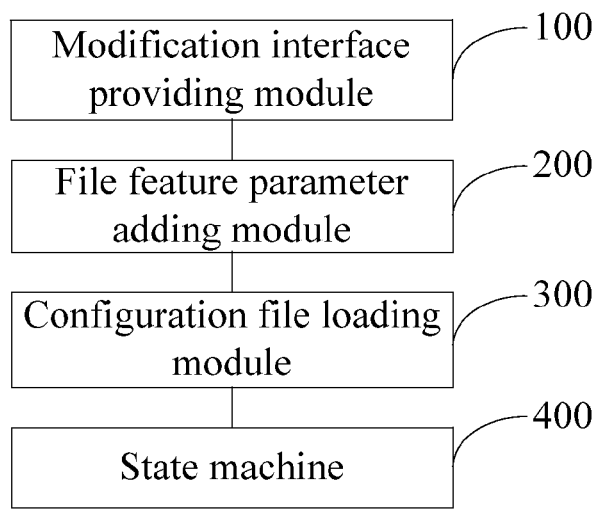
FIG. 4 is a schematic structural diagram of a system for identifying a file type according to an embodiment of the present invention.

As shown in FIG. 4, a system for identifying a file type according to an embodiment of the present invention includes a modification interface providing module 100, a file feature parameter adding module 200, a configuration file loading module 300, and a state machine 400.

The modification interface providing module 100 is configured to provide a modification interface, where the modification interface is used to update a file feature parameter in a file type configuration file.

The file feature parameter may include feature field information and may also include a name extension. The feature field information may include a feature field type, feature field content, a feature field length, and a feature field offset. The modification interface may be a Web page.

The file feature parameter adding module 200 is configured to receive a file feature parameter, and add the file feature parameter to the corresponding file type configuration file to obtain an updated file type configuration file, where the file feature parameter is input by a user by using the modification interface.

The file type configuration file may be an extensible markup language (XML) configuration file.

The configuration file loading module 300 is configured to load the updated file type configuration file to the state machine 400 to cause a file feature parameter in the state machine 400 to be updated, so that the state machine 400 performs file type identification according to the updated file feature parameter.

The state machine is a compiled data structure used to match a predefined mode set, and can be applied to file identification. After the file feature parameter is loaded to the state machine, the file type identification can be performed by using the state machine. Specifically, multiple states may be set in a state machine of a tree structure, and when a certain state matches an object to be matched, state transition can be performed according to node distribution of a state tree.

Figure 5:
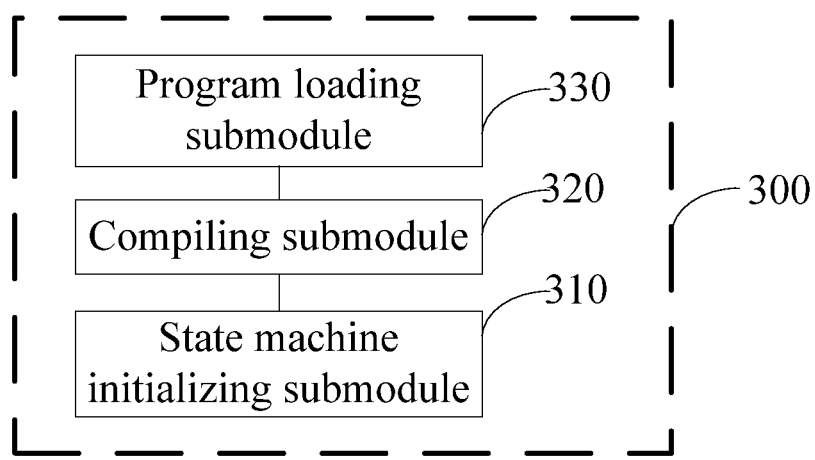
FIG. 5 is a schematic structural diagram of a configuration file loading module in another system for identifying a file type according to an embodiment of the present invention.

As shown in FIG. 5, in another system for identifying a file type according to an embodiment of the present invention, the configuration file loading module 300 may include: a state machine initializing submodule 310, a compiling submodule 320, and a program loading submodule 330, where the state machine initializing submodule 310 is configured to control the state machine to perform initialization; the compiling submodule 320 is configured to compile the file type configuration file after the initialization of the state machine is complete to generate a target program; and the program loading submodule 330 is configured to load the target program to the state machine.

Figure 6:
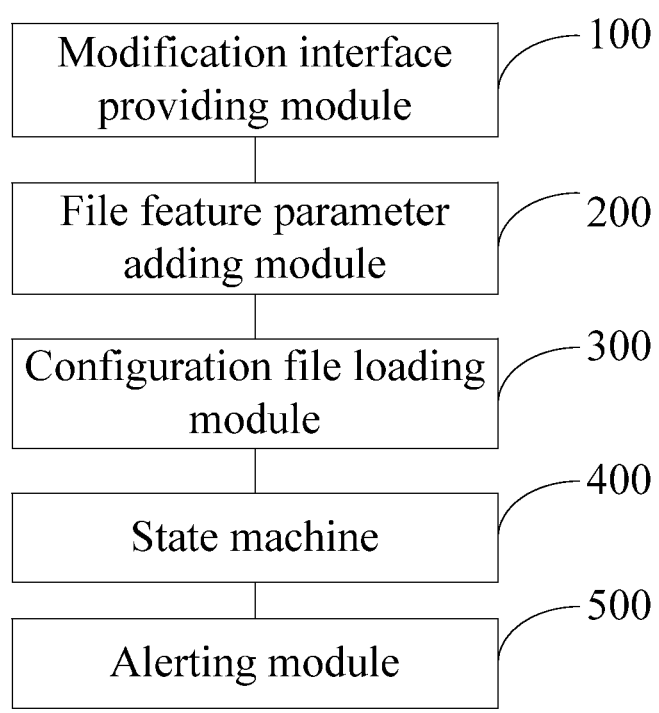
FIG. 6 is a schematic structural diagram of another system for identifying a file type according to an embodiment of the present invention.

As shown in FIG. 6, another system for identifying a file type according to an embodiment of the present invention may further include an alerting module 500 configured to perform alerting processing when the file type identification of the state machine fails.

In the system for identifying a file type provided in the present invention, a modification interface may be provided so that a user inputs a file feature parameter, and the file feature parameter input by the user is added to a file type configuration file, then the file type configuration file is loaded to a state machine to perform file type identification. Therefore, the user can modify a file feature parameter in the original file type configuration file, and when a file feature parameter of a file of a certain type is changed or a file of a new type appears, the user can update a file feature parameter in the state machine in time to identify the changed file or the file of the new type. In this way, the user does not need to search for an identification tool on the Internet.

For the system embodiments, because they basically correspond to the method embodiments, for a relevant part, reference may be made to a part of the description of the method embodiments. The described system embodiments are merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. A person of ordinary skill in the art may understand and implement the embodiments of the present invention without creative efforts.

In the several embodiments provided in the present invention, it should be understood that the disclosed systems and methods may be implemented in another manner, without departing from the spirit and scope of the present invention. The current embodiments are merely exemplary and should not be construed as a limitation, and the given specific content should not be constructed as a limitation on the objectives of the present invention. For example, the unit or sub-unit division is merely logical function division and may be other division in actual implementation. For example, a plurality of units or sub-units may be combined. A plurality of units or components may be combined or integrated into another system, or some features may be ignored or not performed.

In addition, the described systems, methods, and schematic diagrams of different embodiments may be combined or integrated with another system, module, technology, or method, without going beyond the scope of the present invention. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely exemplary embodiments of the present invention. It should be noted that a person of ordinary skill in the art may make certain improvements or modifications without departing from the principle of the present invention and such improvements or modifications should fall within the protection scope of the present invention.

What is claimed is:

1. A method for identifying a file type, comprising:
providing a modification interface, wherein the modification interface is used to receive a file feature parameter input by a user, wherein the file feature parameter corresponds to a first file type and comprises the first file type and feature field information, wherein the feature field information comprises a feature field type, feature field content, a feature field length, and a feature field offset, wherein the feature field type is a coding mode which is classified into a character string and a hexadecimal system, wherein the feature field content is a manic number that uniquely identifies the first file type, and wherein the feature field offset is a position at which a feature field appears in file content;
adding the file feature parameter to a file type configuration file for identifying a file of the first file type to obtain an updated file type configuration file, wherein the file feature parameter is input by a user by using the modification interface;
loading the updated file type configuration file to a state machine to cause a file feature parameter in the state machine to be updated;
receiving a first file;
performing file type identification for the first file using the state machine; and
identifying a file type of the first file as the first file type when the file feature parameter in a state of the state machine matches a feature parameter of the first file, wherein the state of the state machine indicates the first file type.

2. The method according to claim 1, wherein the loading the updated file type configuration file to the state machine comprises:
controlling the state machine to perform initialization;
compiling the updated file type configuration file after the initialization of the state machine is complete to generate a target program; and
loading the target program to the state machine.

3. The method according to claim 1, wherein the method further comprises:
preforming alerting processing when the file type identification of the state machine fails.

4. The method according to claim 1, wherein the file type configuration file is an extensible markup language (XML) configuration file.

5. The method according to claim 1, wherein the modification interface is a web page or a command line interface.

6. A system for identifying a file type, comprising:
a user interface that is configured to receive a file feature parameter input by a user, wherein the file feature parameter corresponds to a first file type and comprises the first file type and feature field information, wherein the feature field information comprises a feature field type, feature field content, a feature field length, and a feature field offset, wherein the feature field type is a coding mode which is classified into a character string and a hexadecimal system, wherein the feature field content is a magic number that uniquely identifies the first file type, and wherein the feature field offset is a position at which a feature field appears in file content;
a processor and a memory comprising instructions which, when executed, cause the processor to:
add the file feature parameter to a file type configuration file for identifying a file of the first file type to obtain an updated file type configuration file, wherein the file feature parameter is received by the user interface;
load the updated file type configuration file to a state machine to cause a file feature parameter in the state machine to be updated;
receive a first file;
perform file type identification for the first file using the state machine; and
identify a file type of the first file as the first file type when the file feature parameter in a state of the state machine matches a feature parameter of the first file, wherein the state of the state machine indicates the first file type.

7. The system according to claim 6, wherein the instructions further cause the processor to:
control the state machine to perform initialization;
compile the updated file type configuration file after the initialization of the state machine is complete to generate a target program; and
load the target program to the state machine.

8. The system according to claim 6, wherein the instructions further cause the processor to:
perform alerting processing when the file type identification of the state machine fails.

9. The system according to claim 6, wherein the file type configuration file is an extensible markup language (XML) configuration file.

10. The system according to claim 6, wherein the user interface is a web page or a command line interface generated by the processor executing the instruction stored in the memory.

11. A non-transitory computer readable medium storing computer executable instructions that when executed in a computer performs the steps of:
providing a modification interface, wherein the modification interface is used to receive a file feature parameter input by a user, wherein the file feature parameter corresponds to a first file type and comprises the first file type and feature field information, wherein the feature field information comprises a feature field type, feature field content, a feature field length, and a feature field offset, wherein the feature field type is a coding mode which is classified into a character string and a hexadecimal system, wherein the feature field content is a magic number that uniquely identifies the first file type, and wherein the feature field offset is a position at which a feature field appears in file content;
adding the file feature parameter to a corresponding file type configuration file for identifying a file of the first file type to obtain an updated file type configuration file, wherein the file feature parameter is received by using the modification interface; and
loading the updated file type configuration file to a state machine to cause a file feature parameter in the state machine to be updated;
receiving a first file;
performing file type identification for the first file using the state machine; and
identifying a file type of the first file as the first file type when the file feature parameter in a state of the state machine matches a feature parameter of the first file, wherein the state of the state machine indicates the first file type.

* * * * *